May 20, 1930. J. L. DRAKE 1,759,228
PROCESS AND APPARATUS FOR PRODUCING MOLTEN GLASS
Filed July 23, 1927
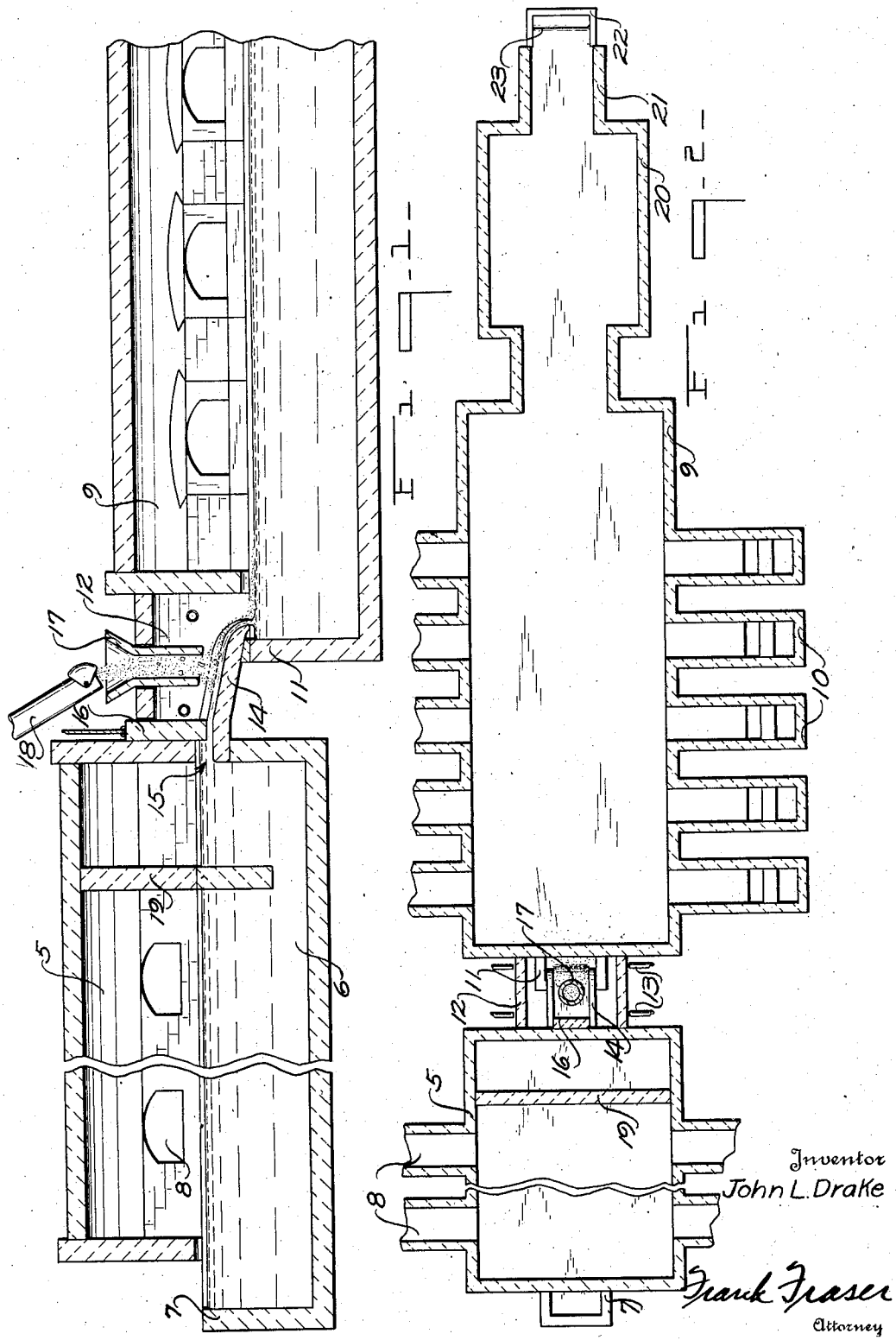
Inventor
John L. Drake
Frank Fraser
Attorney Patented May 20, 1930

1,759,228

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

PROCESS AND APPARATUS FOR PRODUCING MOLTEN GLASS

Application filed July 23, 1927. Serial No. 207,868.

This invention relates to an improved process and apparatus for producing molten glass for the manufacture of glass articles.

One of the objects of the present invention is to provide a tank furnace installation wherein the raw glass making materials fed thereto will be more quickly and thoroughly fused and amalgamated before the resultant molten glass is permitted to pass to glass article forming apparatus.

Another object of the invention is to provide a tank furnace installation of improved design whereby the capacity of existing tanks may be greatly increased and wherein this may be accomplished without material modification of said existing tanks and at a comparatively small cost.

A somewhat more specific object of the invention is the provision of a tank furnace installation wherein an auxiliary melting tank is associated with the melting tank of a customary tank furnace, molten glass being produced within the auxiliary melting tank and then caused to flow therefrom into the melting tank of the furnace, additional batch being added to the molten glass as it flows from one tank into the other and means being preferably provided for preheating the additional batch added to the end that the glass making materials may be reduced to a molten state in a more rapid and efficient manner than heretofore.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through a portion of a furnace installation illustrating the present invention, and Fig. 2 is a diagrammatic plan view of the apparatus.

In the making of glass, it is customary to use a batch including some raw materials and some cullet and it has been found advantageous to use a relatively large percentage of cullet in said batch. The cullet used may be either scrap glass gathered after the cutting operation or it may be especially made for this purpose. When making cullet for use in the glass batch, it is customary to first produce a body of molten glass in a tank or container and then, while flowing this glass from said tank, cause it to rapidly cool and break into relatively small particles known as cullet. When making this cullet, the heat from the molten glass is of course lost and it is an aim of the present invention to avoid such heat loss as results from such a method.

To accomplish this aim, the molten glass is not solidified or changed into cullet and then subsequently mixed with the raw materials fed into the furnace, but instead, it is flowed in a molten state directly from the tank in which it is produced into the melting tank of a suitable tank furnace, the raw materials being added thereto as it flows from the one tank into the other tank. It will be evident that since a relatively large percentage of cullet is used, a correspondingly large heat loss is encountered incident to the cooling of the molten glass which necessitates the subsequent remelting thereof. Thus, by flowing the molten glass or molten cullet, as it may be called, directly into a tank furnace from the tank in which it is produced, this heat loss is obviated, and the melting capacity of the furnace correspondingly increased.

Referring to the drawings, the numeral 5 designates a melting tank within which is adapted to be produced a mass of molten glass 6, and which glass may be hereinafter termed molten cullet. The glass batch ingredients are preferably introduced into this tank through an open compartment or dog house 7 and the melting thereof may be accomplished by means of regenerators located at opposite sides of the said tank, the flames from said regenerators issuing thereinto alternately from one side thereof and then the other through one or any suitable number of ports 8.

Positioned at the opposite end of the tank 5 and spaced therefrom is a tank furnace including a melting tank 9 adapted for receiving the molten glass from tank 5, said tank 9 being preferably heated by regenerators 10 and provided at the end thereof adjacent tank 5 with an open compartment or dog house 11. Arranged between the two tanks 5 and 9 is a closed heating compartment or chamber 12 preferably heated by burners 13 arranged in close proximity thereto, the flames from said burners being adapted to pass through openings in the side walls thereof.

Disposed within the heating compartment 12 is a trough 14 adapted for conveying the molten glass from the tank 5 to tank 9. The molten glass is caused to flow into the trough through an opening 15 in the adjacent end wall of tank 5, the said molten glass emptying into the dog house 11 of tank 9. A vertically adjustable gate or shear cake 16 may be provided for controlling the opening 15 and the amount of molten glass flowing into and through the trough 14. Also arranged within the heating compartment 12 and depending through the roof thereof is a batch receiving hopper or the like 17 adapted for intermittently or continuously receiving batch from a chute 18 and depositing it upon the molten glass within the trough 14.

In carrying out the present invention, the batch which may include some raw materials and some cullet or which may consist entirely of raw materials or entirely of cullet is first introduced into and melted within the tank 5 to form the mass of molten glass or molten cullet 6. This molten glass is then caused to flow under a baffle wall 19 in said tank, through the opening 15 and trough 14 into the tank 9, a sufficient quantity of glass making materials being added to the molten glass as it flows through the trough 14, the said glass making materials being introduced through the hopper 17. The added glass making materials or batch flowing with the molten glass into the tank 9 will be melted therein after which the resultant molten glass will be caused to flow through a refining chamber 20, cooling chamber 21 into a working receptacle or draw pot 22 from which it may be drawn away in sheet form as at 23 or formed into other glass articles as desired.

The batch added to the molten glass within the heating compartment 12 may also include some raw materials and some cullet or it may consist entirely of raw materials or entirely of cullet, the kind of batch added depending to a great extent upon the kind of batch introduced into the tank 5, so that the desired percentages of raw materials and cullet in the resultant molten glass may be obtained.

The burners 13 not only serve to control the temperature of the molten glass within the trough 14, but further serve to preheat the glass making materials or batch gravitating through the hopper 17. With such a furnace construction as disclosed herein, it will be evident that the batch will be more quickly and thoroughly fused and amalgamated before the resultant molten glass is permitted to pass to the glass article forming apparatus, also that the melting capacity of the furnace will be greatly increased due to the elimination of heat losses.

It is to be understood that the form of the invention herewith shown and described is to be taken as the preferred embodiment of the same, and that various changes in the shape, size and arrangement of parts may be restored to without departing from the spirit of the invention or the scope of the subjoined claims.

Claims:

1. In glass apparatus, a tank furnace construction comprising a melting tank within which a mass of molten glass is produced, a second melting tank in proximity to the first tank, a restricted passage connecting the two tanks and through which the molten glass is caused to flow from the first tank into the second tank, and means for depositing additional glass making materials upon the molten glass as it flows through said restricted passage from the first tank to the second tank.

2. In glass apparatus, a tank furnace construction comprising a melting tank containing a mass of molten glass, a second melting tank in proximity to the first tank, means for conveying the molten glass from the first tank to the second tank in relatively thin stream form, and means for mixing additional glass making materials with the stream of molten glass as it is conveyed from the first tank to the second tank.

3. In glass apparatus, a tank furnace construction comprising a tank containing a mass of molten glass, a second tank adjoining but spaced from the first tank and adapted to receive the molten glass therefrom, a heating compartment through which the molten glass flows from the first tank to the second tank, and means for adding additional glass making materials to the molten glass as it flows through said heating compartment from the first tank to the second tank.

4. In glass apparatus, a tank furnace construction comprising a melting tank within which a mass of molten glass is produced, a second melting tank adjoined in spaced relationship to said first tank, a heating compartment arranged between said tanks, means for conveying the molten glass from the first tank through the heating compartment and depositing it in the second tank, and means for adding additional glass making materials to the molten glass as it is conveyed through said heating compartment.

5. In glass apparatus, a tank furnace construction comprising a melting tank within which a mass of molten glass is produced, a second melting tank adjoined in spaced relationship to said first tank, a heating compartment arranged between said tanks, means for causing the molten glass to flow from the first tank through the heating compartment to the second tank, and means within said heating compartment for depositing additional glass making materials upon the molten glass as it flows therethrough.

6. In glass apparatus, a tank furnace construction comprising a tank containing a mass of molten glass, a second tank adjoining but spaced from the first tank and adapted to receive the molten glass therefrom, a heating compartment between said tanks through which the molten glass passes as it flows from the first tank to the second tank, means for adding additional batch to the molten glass as it flows from the one tank to the other tank, and means for controlling the temperature of the heating compartment and for preheating the batch being added to the molten glass.

7. In glass apparatus, a tank furnace construction comprising a melting tank within which a mass of molten glass is produced, a second melting tank adjoined in spaced relationship to said first tank, a heating compartment arranged between said tanks, a trough arranged in said heating compartment through which the molten glass is caused to flow from the first tank to the second tank, and a hopper also within said heating compartment for receiving additional batch and depositing it upon the glass within said trough.

8. In glass apparatus, a tank furnace construction comprising a tank containing a mass of molten glass, a second tank adjoining but spaced from the first tank and adapted to receive the molten glass therefrom, a heating compartment arranged between said tanks and through which the molten glass passes as it flows from the first tank to the second tank, means for adding additional batch to the molten glass as it flows through said heating compartment from the first tank to the second tank, and a refining chamber, a cooling chamber and a working receptacle associated with said second tank for receiving the molten glass therefrom.

9. The process of producing molten glass which consists in establishing a confined pool of molten glass, causing the glass to flow from this pool to a second pool through a restricted passage, and in adding additional glass making materials to the molten glass as it passes through the restricted passage from the first pool to the second pool.

10. The process of producing molten glass which consists in establishing a confined pool of molten glass, causing the glass to flow from this pool into a second pool in relatively thin stream form, and in adding additional glass making materials to the stream of molten glass as the glass flows from the first pool into the second pool.

11. The process of producing molten glass which consists in establishing a confined pool of molten glass, causing the glass to flow from this pool to a second pool, adding to the molten glass additional glass making materials as it passes from the first pool to the second pool, preheating the additional glass making materials prior to their addition to the molten glass, and then heating the second pool of glass to melt the added glass making materials.

12. The process of producing molten glass which consists in establishing a confined pool of molten glass, causing the glass to flow from this pool through a heating zone to a second pool, and adding additional glass making materials to the molten glass as it passes through said heated zone.

13. The process of producing molten glass which consists in establishing a confined pool of molten glass, causing the glass to flow from this pool through a restricted passage in relatively thin stream form to a second pool, adding additional glass making materials to the stream of molten glass as the said glass passes from the first pool to the second pool through the restricted passage, heating the second pool of glass to melt the added glass making materials, and then refining and cooling the glass.

Signed at Toledo, in the county of Lucas and State of Ohio, this 21st day of July, 1927.

JOHN L. DRAKE.